July 5, 1966  J. WILLY  3,258,812

CASTING BELT FOR FOAM MAKING APPARATUS

Filed July 30, 1964

*INVENTOR.*
JOHN WILLY

BY
ATTORNEYS

United States Patent Office 3,258,812
Patented July 5, 1966

3,258,812
CASTING BELT FOR FOAM MAKING APPARATUS
John Willy, Attleboro, Mass., assignor to Specialty
Converters, Inc., a corporation of Delaware
Filed July 30, 1964, Ser. No. 386,319
5 Claims. (Cl. 18—4)

This invention relates to foam making apparatus and more particularly it relates to a casting belt for such apparatus which is tightly woven from strands extending in at least two directions and has a coating on one surface which is releasable with respect to the foam ingredients.

In the process for continuously casting thin foam sheets, the apparatus generally used consists of a dispensing apparatus for spreading an unreacted foam mixture on a casting belt which is continuously run through the foam making apparatus. Once the foam mixture is spread on the casting surface it is carried through a nip usually defined between a pair of doctor rollers which limits the amount of foam mixture to a uniform thickness that is spread continuously on the casting surface. Since a small amount of foam mixture will expand to a relatively large foam shape, the thickness of the foam mixture is usually many times less than the thickness of the foam sheet to be formed. The reaction of the foam mixture is temperature controlled so that it does not begin until the mixture has passed through the nip of the rolls. Ordinarily, before and after the full gaseous reaction has taken place the foam sheet formed is then passed through suitable curing ovens to accelerate the curing process so that the foam sheet becomes substantially cured, non-tacky, and self-supporting. The foam mixture is itself very tacky and tends to adhere to almost any surface to which it comes in contact while it is reacting. Experience has found that a casting surface must be used during the formation of foam sheets which are releasable with respect to the foam mixture and to the foam sheet which is formed from the foam mixture, and yet has sufficient strength to give lengthy service.

Of the casting surfaces which have been used heretofore, those generally used have included ordinary paper, glassine paper or parchment paper coated with wax, silicone, polypropylene or other non-adhesive substance. It has also been known that these casting belts can be formed from polytetrafluorethylene or a plastic coated with silicone, as both polytetrafluorethylene and silicone have excellent releasable properties with respect to the foam mixture. Paper coated belts have been generally unacceptable principally because they are susceptible to wear and often are unable to withstand the tension to which they are subjected and will split or tear. An additional problem in the selection for a suitable casting belt and an important one has been finding a casting belt which has widths in the range of 10 to 15 feet as are required in the manufacture of foam sheets to be used in the carpet industry. This width requirement has presented a very practical problem, the solution to which was not easy mainly because of he unavailability of most materials, including the plastic sheets, in these wide widths.

Another important feature in the search for a suitable casting belt has been the consideration of a belt which is characterized by substantially uniform thickness so that when the belt passes through the nip of the doctor rollers, the amount of foam mixture which is deposited on the casting surfaces is uniform. The very small amount of foam mixture thickness which is deposited on the casting surface is such that any variance in the thickness of the casting belt would normally be reflected in the deposit of a non-uniform amount of foam mixture and a corresponding non-uniform foam sheet will be formed. For this reason all casting belts heretofore used have been characterized by uniform thickness and continuous structure throughout.

I have found that a casting belt for use in foam making apparatus of this type can be formed by providing a belt which is tightly woven from strands extending in at least two directions and has a plastic release coating defining the casting surface on one broad face of the belt. This release coating is formed by a plastic layer having surface properties which are releasable with respect to the foam and which is integrally locked to the woven belt and substantially closes the interstices between the woven strands so that the belt its impermeable to the foam mixture. Because the belt is so tightly woven the increment of length of belt which is passing through the nip of rolls at any given time will contain several laterally extending strands thereby giving the same effect as if the belt had uniform thickness. These woven belts are particularly advantageous in that they can be woven to have widths greater than the 10 foot width required by the carpet industry, and having the release coating thereon they provide a permanent release belt which was not heretofore available in the sizes required.

Of the belts which are preferred, a woven wire belt generally known as a Fourdrinier wire belt has proven to be particularly good in this application. These Fourdrinier wire belts are sometimes characterized by having the strands in one direction exposed more on one side than on the other. The belt is then polished until the more exposed strands are flattened on that side so as to present a generally flat surface on that broad face of the wire belt. The release coating is then adhered to this broad face of the belt and the resulting casting belt is characterized by having the plastic release coating formed on this flat surface. These belts have also been formed from Fiberglas strands and wool strands; belts made from these materials are generally available in the widths desired.

Preferred embodiments of the invention are described hereinbelow with reference to the drawings wherein.

Figure 1:
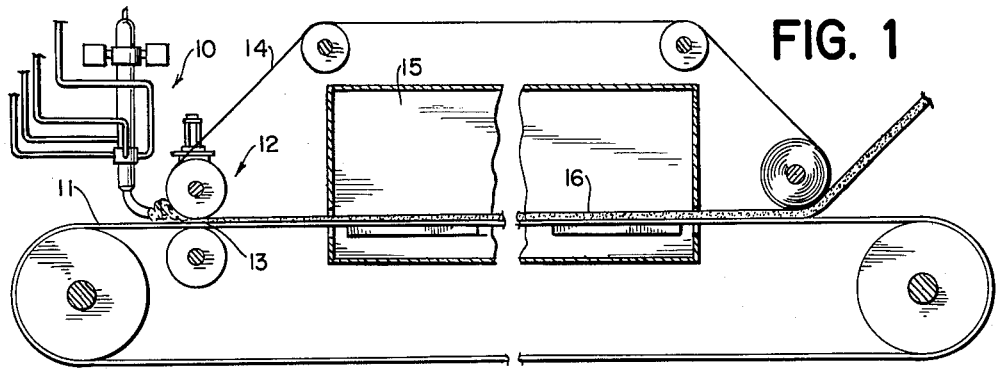
FIG. 1 is a side elevation of part of a foam making apparatus.

As shown in FIG. 1, foam making apparatus for forming thin foam sheets on a continuous basis is generally comprised of a mixing head 10 which is mounted to reciprocate back and forth across the width of a casting surface and deposit a foam mixture thereon. The foam mixture is comprised of a prepolymer and catalyst which are mixed in the mixing head with the prepolymer component and preferably cooled to a temperature at which it will not react with the catalyst. The foam produced on this apparatus is polyurethane foam which is formed from a polyisocyanate and a hydroxyl-containing compound. The particular mixtures used are well-known in the art.

The prepolymer and catalyst comprising the foam mixture are mixed in the mixing head, deposited onto a continuous casting belt 11, and then carried through a pair of doctoring rolls 12 which have a nip 13 therebetween defined by a combination of the spacing between rolls and the thickness of the casting belt 11. As shown, a covering belt 14 is also fed between the rolls and its thickness should also be considered in determining the nip size. The covering web 14 is shown as continuous and can be constructed of any release coated material of the type formerly used and can be constructed similar to the casting belt to be described below. Thus, by the term "casting belt" used in this application, it is intended that it include a belt used as a covering web as well as the carrier web in this type apparatus.

Very little foam mixture is necessary between the webs to produce a sheet of substantial thickness; for example, a gap of only 0.0167 inch will produce a 0.50 inch sheet. Once the foam mixture is spread on the casting belt it is then carried through the heating zone 15 which is maintained at a temperature which accelerates the complete gaseous expansion of the foam mixture and cures the resulting foam sheet 16 to a point at which it becomes self-supporting and non-tacky. When this condition is reached, the foam sheet is stripped from the casting belt 11 and the covering belt 14. Unless the broad surfaces of the casting belt or covering belt are releasable with respect to the foam material, the foam sheet 16 would be bonded to the belts at this point.

The construction of the casting belt 11 must be such that it will withstand the tensile forces imposed upon it and thereby have a long operating life. It also must be available in widths in excess of 10 feet so that it will have application to foam products formed for use in the carpet industry. Finally the casting belt must have a construction which enables it to present an essentially uniform dimension as the carrier belt passes through the nip of the doctoring rolls so that a uniform deposit of foam mixture can be made on the casting belt. The casting belt shown is comprised of a belt 18 made from woven strands of wire, Fiberglas, or wool. The strands are tightly woven so that the belt has dimensional stability, and the tight weave is also made with a conscious effort toward always presenting at the nip of the doctor rolls an incremental length of what is effectively a uniform thickness. By providing a tight weave so that there will always be several laterally extending strands at the nip between the rolls, the effect always will be to present a uniform thickness of casting belt so as not to interfere with the uniform deposit of foaming mixture thereon.

Figure 2:
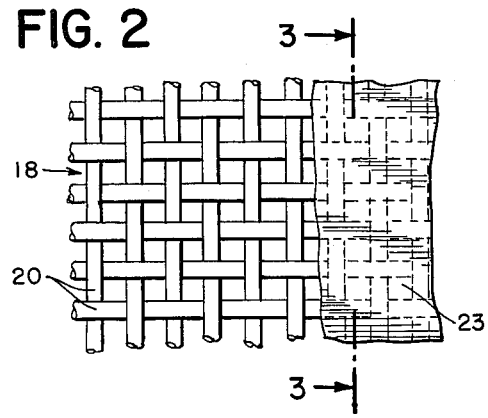
FIG. 2 is a plan view partly broken away of one embodiment of a casting belt.
Figure 3:
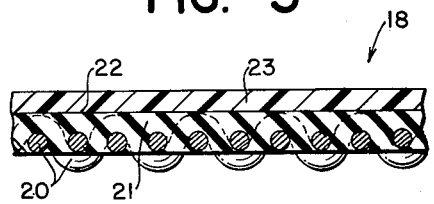
FIG. 3 is in section of the casting belt taken along lines 3—3 of FIG. 2.

In FIG. 2 and FIG. 3 a belt of interwoven Fiberglas strands 20 is shown. This belt has a coating of neoprene rubber 21 which is locked within the body of the belt around the strands and presents a broad intermediate surface 22 at one side of the belt. The neoprene rubber coating 21 substantially fills the interstices and provides a good mechanical and adhesive interlock with the belt. Then a release coating of say silicone oils, wax or other release coatings 23 that will adhere to this base coating is applied in surface-to-surface adhesive contact with the intermediate surface 22 of neoprene rubber 21. The composite structure is a belt with a release coating integrally locked to the strands so that the structure is not permeable to the foam mixture. The intermediate coating has been used in some applications in order to fill the interstices of the woven belt. The release coatings sometimes will not readily adhere to the strands because the very nature of these coatings is that they are releasable. By applying an intermediate coating to which the release coating adheres readily, this problem can be overcome.

Figure 4:
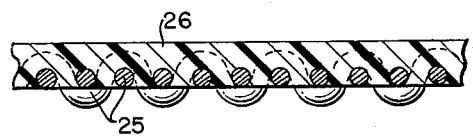
FIG. 4 is a section of a second embodiment of the casting belt of the invention.

As shown in FIG. 4, the woven strands 25 can be wool and here, a single release coating 26 of silicone or polytetrafluoroethylene is applied to the woven strands present a release surface 25 which defines one broad face of the casting belt.

Figure 5:
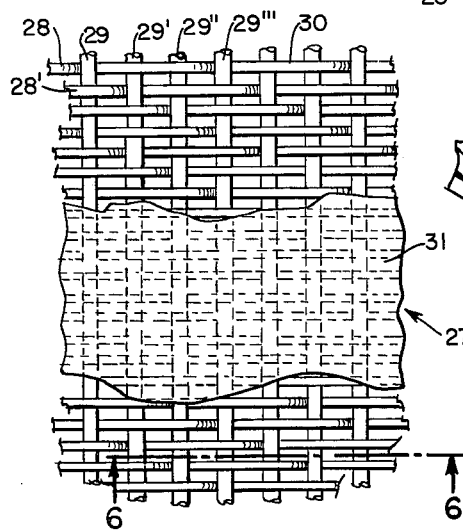
FIG. 5 is a plan view of a third embodiment of the casting belt of the invention.
Figure 6:
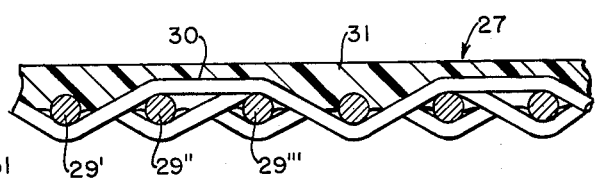
FIG. 6 is a section taken along lines 6—6 of FIG. 5.

In FIGS. 5 and 6 the basic belt 27 is formed from a woven wire, in this case a Fourdrinier wire belt. It is to be noted that the wire strands 28 in the lateral direction have a different pattern than the usual alternate over and under weave. This is shown in FIG. 6 wherein the lateral wire 28 is woven so that it extends under one longitudinal strand 29, then over the next two longitudinal strands 29' and 29" and then under the next strand 29''', etc. In the next succeeding lateral row defined by the lateral strand 28', the pattern is the same but the lateral strand pattern begins at the next longitudinal strand 29' so that the pattern repeats diagonally along the belt. As shown in FIG. 6, there is thereby a greater length of lateral strands exposed on the top surface than there is in the bottom surface. Also the portion of the lateral strands at the top surface 30 are polished slightly so that this portion on the top surface is slightly flattened. The result is a rather flat but discontinuous top broad surface on the basic belt.

These wires preferably have a mesh opening of less than $\frac{1}{64}$" and the wires are of a diameter of about 0.0045" with 100 of such wires running in either of two directions per inch. The wire fabric is then coated with multiple layers of a release coating 31 by repeated applications of the various film forming ingredients, until the coating thicknesses have built up to a thickness sufficient substantially to close the holes between the wires and to form a relatively smooth surface which is impermeable to the foam mixture. In this respect, it is to be noted that the presently preferred mesh size is from about 40–70, as this range permits substantial closure and preserves the incremental uniformity required.

The film forming materials that have been found to be the most desirable are Teflon TFE and Teflon FEP (trademarks of E. I. du Pont de Nemours Co., Inc., Wilmington, Delaware), in which case both of these polymeric fluorine substituted hydrocarbons are suspended in water in finely divided form; silicone rubber, of a type such as are commercially available under the brand name Silastic R.T.V. #589 (Dow Corning Corp., Midland, Michigan); and another silicone compound, Dow Silicone #23 (Dow Corning Corp., which is used with a catalyst obtainable Dow Corning #23A Catalyst).

The two types of Teflon available can be sintered at different temperatures, one at 750° F. and the other at 450° F. and it is proposed to apply the Teflon to the wire belt and subsequently sintering it to form the release surface.

It is not be noted that silicone rubber and Teflon will generally not stick to anything. Therefore in order to obtain a silicone rubber or Teflon coated belt, it is necessary to use a belt which is sufficiently porous to permit penetration of the surface by the silicone rubber or Teflon so that a mechanical bond is formed. Either of these coatings coat all the way around the fibers or wires and the release coating, therefore, stays in place even though there is no adhesive adherence.

It is further to be noted that it is only necessary that the interstices of the belt be closed enough to preclude the foam mixture, either when unreacted or while reacting, from penetrating through the release belt.

I claim:
1. In foaming making apparatus for continuously casting thin foam sheets having a foam mixture dispensing apparatus, a moving casting surface on which the foam mixture is dispensed, and means defining a nip for determining the amount of foam mixture to be passed through the apparatus, the improvement in combination therewith comprising a continuous casting belt having a width in excess of about 10 feet being tightly woven from wire strands extending in at least two directions and mounted in the apparatus to pass through said nip, and a plastic release coating defining said casting surface on one broad surface of the belt, said coating formed by a plastic layer integrally locked to the woven belt and substantially closing the interstices between the woven strands with the plastic characterized by surface properties which are releasable with respect to the foam so that the belt is impermeable to the foam mixture.

2. A casting belt according to claim 1 in which the wire strands are woven such that the strands extending in one direction are woven such that a greater portion extends on one side of the woven belt than on the other with that portion being flattened so as to present a generally flattened surface on one side of the wire belt and the plastic release coating is attached to the broad surface of the belt defined by said flattened portions.

3. Foam making apparatus as in claim 1 wherein the plastic release coating on the casting belt is formed of a plastic selected from the group silicone polymers or polymeric fluorine substituted hydrocarbon.

4. In foam making apparatus for continuously coating thin foam sheets having a foam mixture dispensing apparatus, a moving casting surface on which the foam mixture is dispensed, and doctor rollers defining a nip for determining the amount of foam mixture to be passed through the apparatus, the improvement in combination therewith comprising a continuous casting belt being tightly woven from strands extending in at least two directions and mounted in the apparatus to pass through said nip, said belt having a mesh size which is sufficiently close together so that the increment of length of the belt passing through the nip will comprise a plurality of strands extending in a lateral direction whereby a substantially uniform thickness of foam mixture will be spread on the casting surface on one broad surface of the belt, said coating formed by a plastic layer integrally locked to the woven belt and substantially closing the interstices between the woven strands with the plastic characterized by surface properties which are releasable with respect to the foam so that the belt is impermeable to the foam mixture.

5. Foam making apparatus as in claim 4 wherein the casting belt comprises wire strands.

References Cited by the Examiner
UNITED STATES PATENTS

| | | |
|---|---|---|
| 2,255,364 | 9/1941 | Pink. |
| 2,488,446 | 11/1949 | Swiss. |
| 2,700,630 | 1/1955 | Bukey et al. _____ 156—231 XR |
| 2,955,974 | 10/1960 | Allen et al. |
| 3,110,941 | 11/1963 | Fagg _____ 18—4 XR |

FOREIGN PATENTS

| | | |
|---|---|---|
| 1,147,027 | 4/1963 | Germany. |

WILLIAM J. STEPHENSON, *Primary Examiner.*